(12) United States Patent
Mori et al.

(10) Patent No.: US 7,684,183 B2
(45) Date of Patent: Mar. 23, 2010

(54) IMPACT BUFFER, IMPACT BUFFERING DEVICE, AND INFORMATION PROCESSOR HAVING IMPACT BUFFERING DEVICE

(75) Inventors: Takeshi Mori, Osaka (JP); Katsutoshi Yuasa, Osaka (JP); Toshiya Senoh, Nara (JP); Reiji Matsumura, Osaka (JP); Manabu Kimura, Osaka (JP)

(73) Assignee: Panasonic Corporation, Osaka (JP)

( * ) Notice: Subject to any disclaimer, the term of this patent is extended or adjusted under 35 U.S.C. 154(b) by 67 days.

(21) Appl. No.: 11/968,803

(22) Filed: Jan. 3, 2008

(65) Prior Publication Data

US 2008/0239562 A1   Oct. 2, 2008

(30) Foreign Application Priority Data

Mar. 29, 2007   (JP) .............................. 2007-087426
Sep. 6, 2007   (JP) .............................. 2007-230957
Oct. 15, 2007   (JP) .............................. 2007-267592

(51) Int. Cl.
*G06F 1/16*   (2006.01)

(52) U.S. Cl. .............................. 361/679.36; 361/679.34; 248/636; 248/637; 248/638; 360/97.02; 360/99.12

(58) Field of Classification Search ............. 361/679.36
See application file for complete search history.

(56) References Cited

U.S. PATENT DOCUMENTS

| 4,831,476 | A  | * | 5/1989  | Branc et al. ............... 360/97.02 |
| 6,496,362 | B2 | * | 12/2002 | Osterhout et al. ......... 361/679.34 |
| 6,567,265 | B1 | * | 5/2003  | Yamamura et al. ....... 361/679.34 |
| 6,633,481 | B2 | * | 10/2003 | Pavol ...................... 361/679.36 |
| 6,751,092 | B1 | * | 6/2004  | Ohnishi et al. ........... 361/679.34 |
| 7,016,189 | B2 | * | 3/2006  | Lin ......................... 361/679.34 |
| 7,342,743 | B2 | * | 3/2008  | Kuwajima ................ 360/97.02 |
| 7,345,845 | B2 | * | 3/2008  | Feliss et al. .............. 360/97.02 |
| 7,471,509 | B1 | * | 12/2008 | Oliver ...................... 361/679.33 |
| 2002/0043608 | A1 | * | 4/2002 | Nakata et al. ............. 248/560 |
| 2002/0097556 | A1 | * | 7/2002 | Lee .......................... 361/685 |
| 2003/0072103 | A1 | * | 4/2003 | Kang et al. ............... 360/97.02 |
| 2004/0070867 | A1 | * | 4/2004 | Kudo et al. ............... 360/97.01 |
| 2006/0023416 | A1 | * | 2/2006 | Chen ........................ 361/685 |
| 2008/0151421 | A1 | * | 6/2008 | Asakura et al. .......... 360/97.02 |

FOREIGN PATENT DOCUMENTS

| JP | 05-319347   | 12/1993 |
| JP | 10-141408   | 5/1998  |
| JP | 2005-256982 | 9/2005  |

* cited by examiner

*Primary Examiner*—Jayprakash N Gandhi
*Assistant Examiner*—Anthony Q Edwards
(74) *Attorney, Agent, or Firm*—Pearne & Gordon LLP

(57) ABSTRACT

An impact buffer having a high buffering effect includes two or more impact buffering members with different hardness, contacted with at least one surface of a side surface part of an HDD unit positioned orthogonally to the rotation surface of a magnetic disk of the HDD unit, supports the HDD unit, buffers an impact applied to the HDD unit by expansion and contraction, further moderates the rotation of the HDD unit in the direction causing a head arm to move onto the disk at rest, prevents the head detachment, and can overcome the weaknesses of the head arm and an inertial latch structure.

20 Claims, 7 Drawing Sheets

IMPACT BUFFER, IMPACT BUFFERING DEVICE, AND INFORMATION PROCESSOR HAVING IMPACT BUFFERING DEVICE

BACKGROUND OF THE INVENTION

1. Field of the Invention

The present invention relates to an impact buffer, an impact buffering device, and an information processor having the impact buffering device.

2. Background Art

Recently, the carrying/using frequency of an information processor such as a notebook-size personal computer (hereinafter referred to as "notebook computer") has been increased, the weight and size of the information processor have been decreased, and the portability thereof has been improved. The information processor is therefore required to withstand an impact by an unexpected drop during carrying/using it or a harsh environment such as vibration during using it on a vehicle. For instance, a hard disk drive unit (hereinafter referred to as "HDD unit") can go out of order due to the impact of a drop to damage important data. Therefore, an information processor such as a notebook computer that is carried and used is desired to have higher impact resistance, to be further lightened in weight, and to be further downsized.

A conventional impact buffer and impact buffering device will be described hereinafter.

For instance, Japanese Patent Unexamined Publication No. H05-319347 discloses an impact buffering device having a coil spring and a viscosity resistor employing a cylinder. Thus, an impact buffering device generally has a mechanism employing a viscosity resistor that is constituted by combining a plurality of components such as a cylinder and a spring such as a coil spring.

Japanese Patent Unexamined Publication No. H10-141408 discloses an impact buffer having foam and an auxiliary cover for protecting the foam. When a foam member is used as in this impact buffer, high impact buffering performance is obtained, and the size and weight can be reduced. For reducing the size and weight of a device, use of a foam member is appropriate, hence the impact buffering performance is high and the production cost for mass production is small because of the simple structure thereof, advantageously.

Japanese Patent Unexamined Publication No. 2005-256982 discloses an example employing a foam member as an impact buffering device for protecting an HDD unit of a notebook computer. FIG. 5 is a schematic sectional view of the state where impact buffer 204 for protecting HDD unit 206 is butted and mounted on HDD unit 206 that is apt to be affected by an impact in a conventional notebook computer.

As shown in FIG. 5, the notebook computer has HDD unit 206 apt to be affected by an impact and elastic impact buffer 204 employing a foam member for protecting HDD unit 206. The notebook computer further has HDD case (box) 207 for storing HDD unit 206 and impact buffer 204.

HDD unit 206 has the following elements:
magnetic head 205;
head arm 208 mounted to rotating shaft 210;
magnetic disk (sometimes called a platter) 209 on which magnetic data is recorded; and
head arm rotation stopper 211 for fixing head arm 208 to prevent it from moving freely from a shunting position.

Head arm rotation stopper 211 has an inertia latch structure described later. HDD unit 206 is mounted to casing 214 of the notebook computer via impact buffer 204.

The operation of HDD unit 206 includes operation where magnetic head 205 reads data recorded on magnetic disk 209 or records data on magnetic disk 209. During operation of HDD unit 206, magnetic head 205 is moved to a target position on magnetic disk 209 in a head loading state. Here, in the head loading state, a predetermined separation distance is kept from the surface of magnetic disk 209 for rotating magnetic head 205 at a high speed. Magnetic head 205 and head arm 208 during this operation are shown by broken lines in FIG. 5. During either of non-operation and operation, when HDD unit 206 is in an idling state where no access request is made, magnetic head 205 is moved into a member for shunting (not shown) that is disposed at a position separated from magnetic disk 209. Magnetic head 205 in this state is shunted to the position separated from the disk by head unloading operation. Here, the head unloading operation is performed for locking magnetic head 205 at that position. Magnetic head 205 and head arm 208 during this operation are shown by solid lines. In FIG. 5, counterclockwise arrow 232 shows a head loading direction of head arm 208, and clockwise arrow 233 shows a head unloading direction of head arm 208.

However, a complicated structure such as that of the impact buffering device discussed above is not appropriate for size and weight reduction, and the production cost and maintenance cost are apt to increase. For improving the impact buffering performance of the impact buffer or impact buffering device employing a foam member, generally, the characteristic of the foam member is improved or the foam shape such as volume and mounting area of the foam is optimized. However, further improvement of the buffering performance, further reduction of hazardous gas generated from the foam, and further weight reduction or the like of the impact buffering device are required.

When the impact buffering performance is improved, the foam volume can be enlarged, the weight of the impact buffering device can be increased in response to the enlargement, and the hazardous gas generated from the foam can be increased. Therefore, generally, high impact buffering performance and reduction of the size and weight of the device, and reduction of the amount of generated hazardous gas are mutually contradictory.

Generally, the impact buffering phenomenon can be modeled using the following equation of motion $$m\ddot{z} + c\dot{y} + kx = 0.$$

Here, z is an acceleration of a matter, y is a velocity of the matter, x is a displacement of the matter, m is a mass of the matter, c is a viscous damping coefficient of a viscous resistor, and k is a spring constant of a spring.

The impact buffering member employing a foam member such as resin foam has characteristics of both the spring and the viscous resistor. Therefore, an impact buffer having both desired spring constant (k) and viscous damping coefficient (c) must be used in response to an application. The higher viscous damping coefficient (c) is, the more impact energy is consumed in the impact buffer. However, foam having an ideal characteristic having desired spring constant (k) and viscous damping coefficient (c) is difficult to be produced in response to application. In other words, it is difficult to produce an evolutionary foam shape that exhibits high impact buffering performance. For example, the optimization of the foam shape such as the volume and mounting area of the foam has been considered, but it is difficult to exhibit a sufficient buffering performance in a limited space.

The internal structure corresponding to the dropping impact of HDD unit 206 is described with reference to FIG. 6A through FIG. 6F. In FIG. 6A through FIG. 6F, only parts receiving the impact of casing 214, HDD case 207, and impact buffer 204 are shown. FIG. 6A through FIG. 6F are schematic sectional views for describing the operations of a conventional impact buffering member, impact buffer 204, and HDD unit 206 when a user accidentally drops the notebook computer.

FIG. 6A and FIG. 6D are schematic sectional views showing a state where HDD unit 206 is dropping. FIG. 6B and FIG. 6E are schematic sectional views showing states where HDD unit 206 is tilting to the side of the center of gravity after dropping and colliding against the ground or the like. FIG. 6C and FIG. 6F are schematic sectional views showing states where the restoring force of impact buffer 204 works after HDD unit 206 drops and collides against the ground or the like.

As shown in FIG. 6A and FIG. 6D, the center-of-gravity position of HDD unit 206 is assumed to be on the right side of the center line (dashed line) of the substantially rectangular casing surface of HDD unit 206.

First, using FIG. 6A, FIG. 6B and FIG. 6C, operation when the installation space on impact buffer 204 and thickness of an elastic member are sufficient to withstand an impact by a drop is described.

As shown in FIG. 6A, thickness L1 of impact buffer 204 for protecting HDD unit 206 is assumed to be sufficient to absorb the impact by the drop of HDD unit 206. When HDD unit 206 drops toward the ground or a desk in the direction of arrow 240, casing 214 of the notebook computer collides against the ground or the desk in a short time, as shown in FIG. 6A. As a result, as shown in FIG. 6B, displacement of the center-of-gravity position of HDD unit 206 from the center line of the substantially rectangular casing surface of HDD unit 206 causes HDD unit 206 to rotate clockwise (direction of arrow 213). Impact buffer 204 sufficiently absorbs the impact. Then, as shown in FIG. 6C, the restoring force of impact buffer 204 causes HDD unit 206 to rotate counterclockwise (direction of arrow 212) to slowly restore it. At this time, the rotation of HDD unit 206 is slow, so that the head detachment (described later) does not occur.

Next, using FIG. 6D, FIG. 6E and FIG. 6F, operation when the installation space on impact buffer 204 and thickness of an elastic member are restricted is described.

As shown in FIG. 6D, thickness L2 of impact buffer 204 for protecting HDD unit 206 is assumed to be thinner than L1 and is not sufficient to absorb the impact by the drop of HDD unit 206. When HDD unit 206 drops on the ground or a desk, as shown in FIG. 6E, displacement of the center-of-gravity position of HDD unit 206 from the center line of the substantially rectangular casing surface of HDD unit 206 causes HDD unit 206 to also rotate clockwise (direction of arrow 213). HDD unit 206 cannot completely absorb the impact by the rotation, so that impact buffer 204 is crushed into a state near a rigid body. Therefore, rotation moment sharper than that in FIG. 6B occurs. A case where this rotation moment occurs in latch non-operation mode of the inertial latch structure is described hereinafter in detail.

As shown in FIG. 6E, when HDD unit 206 drops on the ground or the desk, the displacement of the center of gravity of HDD unit 206 first causes HDD unit 206 to rotate clockwise (direction of arrow 213). Impact buffer 204 cannot absorb the impact, so that the lower right corner of HDD unit 206 collides against HDD case 207. Then, the rebound of the collision and the restoring force of impact buffer 204 cause HDD unit 206 to rotate counterclockwise (direction of arrow 212). HDD unit 206 therefore rotates counterclockwise (direction of arrow 212) so as to press impact buffer 204 downward while impact buffer 204 absorbs the impact. Then, as shown in FIG. 6F, the lower left corner of HDD unit 206 collides against HDD case 207, and head arm 208 can rotate counterclockwise (direction of arrow 232) due to this impact and inertia to move from the shunting position onto magnetic disk 209.

Head arm 208 is kept in weight balance with respect to rotating shaft 210, so that only the surface dropping impact of HDD unit 206 in each plane direction acts. Therefore, when HDD unit 206 does not rotate, the rotation moment of head arm 208 does not occur, and head arm 208 does not rotate.

However, generally, the direction of the dropping impact does not become stable, and HDD unit 206 rotates in the direction responsive to the positional relationship between the landing surface and the center of gravity of HDD unit 206 during acting of the dropping impact.

Head arm 208 therefore starts to rotate relatively to HDD unit 206 due to the inertia. In other words, when the thickness of the elastic member of impact buffer 204 is not sufficient, impact buffer 204 cannot sufficiently absorb the impact by the drop. As a result, as shown in FIG. 6F, when the impact of the collision applied to HDD unit 206 is large, head arm 208 continues to rotate due to the inertia. Then, head arm 208 rotates from the shunting position in the direction of arrow 232, and can move and adhere onto magnetic disk 209.

During non-operation of HDD unit 206, head arm 208 is fixed to the shunting position with the inertial latch structure of head arm rotation stopper 211. When HDD unit 206 rotates in the direction of arrow 212, the impact received by HDD unit 206 is transferred to head arm 208 as it is. As a result, with some impact timing, the inertial latch structure of head arm rotation stopper 211 comes off, and head arm 208 starts to rotate in the direction of arrow 232. When the impact is large, head arm 208 continues to rotate due to the inertia, becomes detached from the shunting position, and moves and adheres onto magnetic disk 209. These phenomena are called head detachment.

Here, when an impact causes HDD unit 206 to rotate, the inertial latch structure latches head arm 208 to regulate the rotation before head arm 208 rotates and moves to a breakdown position.

HDD unit 206 essentially includes a structure capable of engaging a latch regardless of the direction of the rotation of HDD unit 206. When HDD unit 206 starts to rotate in the opposite direction (direction of arrow 212) after operation of the inertial latch structure, however, time lag occurs in latch operation until restart of the inertial latch structure. When head arm 208 rotates counterclockwise (direction of arrow 232) due to inertia as in FIG. 6F and the left end of HDD unit 206 collides against HDD case 207 in a short time during the time lag, the inertial latch structure does not work, the motion of head arm 208 cannot be inhibited, and head detachment occurs sometimes.

In other words, when the factors of both the rotation of the head arm and timing of non-operation of the inertial latch structure conspire, head detachment occurs disadvantageously.

SUMMARY OF THE INVENTION

An impact buffer of the present invention includes two or more impact buffering members with different hardness, and the impact buffering members include at least a first impact buffering member and a second impact buffering member with a hardness lower than that of first impact buffering member. The first impact buffering member and the second impact buffering member are disposed on at least one surface of a side surface part of a hard disk drive unit (HDD unit) that is orthogonal to a magnetic disk surface of the HDD unit. When the impact buffer is compressed and deformed by an impact applied to the HDD unit, the impact buffer supports and expands/contracts the HDD unit rotates in the head unloading direction of a head arm of the HDD unit, and the impact buffer buffers the the impact applied to the HDD unit.

In such a structure, the impact buffering members are promoted to consume impact energy, and the impact buffering members constituting the impact buffer are made to serve as a viscous resistor by themselves. Therefore, the impact buffer moderates the rotation due to free fall of the HDD unit. Since the impact buffer is formed of impact buffering members with different hardness, rotation in the direction (head unloading direction) opposite to the rotation of the HDD unit in the direction (head loading direction) is firstly generated. Here, the rotation in the head loading direction causes the head arm to move onto the disk at rest. Therefore, the head detachment is not caused.

The impact buffer absorbs the drop impact and generates moderate restoring force after its drop. The restoring force is designed so that the rotation of the HDD unit in the direction (head loading direction) causing the head arm to move onto the disk at rest is more moderate than the rotation due to free fall. Head detachment can be therefore prevented. As a result, an impact buffer having a high buffering effect capable of compensating weak points of the head arm and inertial latch structure can be obtained.

DETAILED DESCRIPTION OF THE INVENTION

Exemplary embodiments of the present invention will be described with reference to the accompanying drawings.

First Exemplary Embodiment

The first exemplary embodiment of the present invention will be described with reference to FIG. 1A, FIG. 1B, FIG. 1C, FIG. 1D, FIG. 2A, FIG. 2B and FIG. 2C.

Figure 1A:
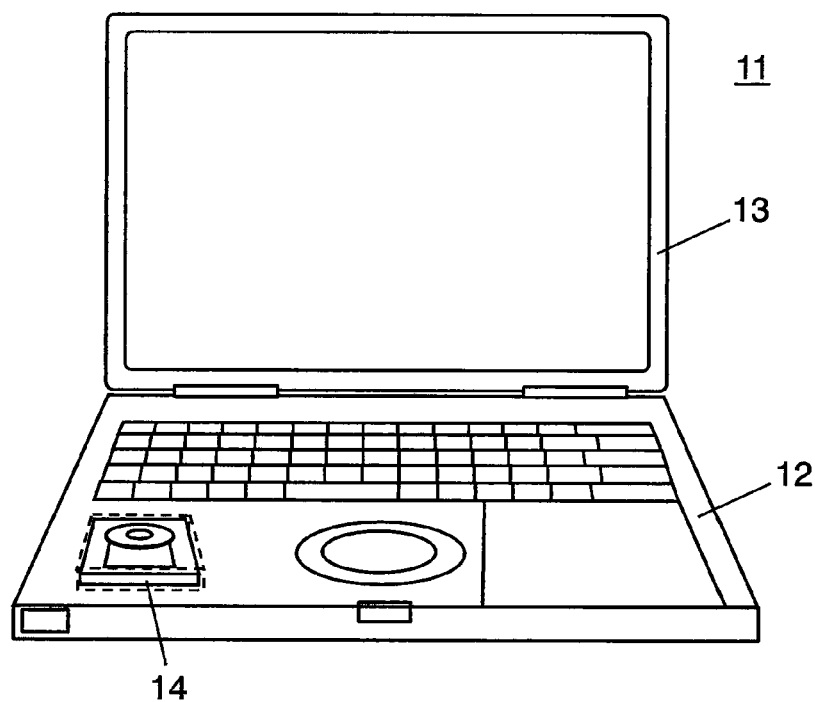
FIG. 1A is an outward appearance of a state where an HDD unit covered with an impact buffer is stored in a notebook computer in accordance with a first exemplary embodiment of the present invention.
Figure 1B:
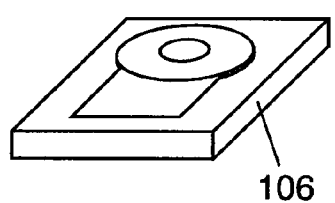
FIG. 1B is an outward appearance showing the single HDD unit.
Figure 1C:
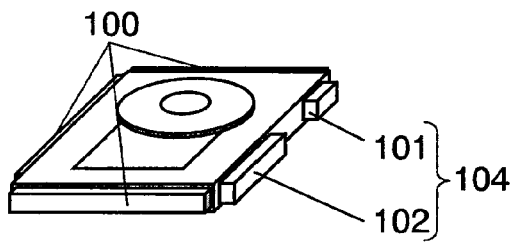
FIG. 1C is an outward appearance showing a state where the impact buffer is stuck to the HDD unit.
Figure 1D:
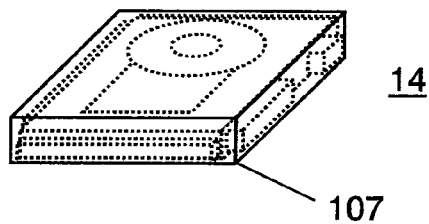
FIG. 1D is an outward appearance showing a state where the impact buffer is stuck to the HDD unit and the HDD unit is stored in an HDD case.

FIG. 1A is an outward appearance of a state where HDD unit 106 covered with an impact buffer is stored in a notebook computer in accordance with the first exemplary embodiment. FIG. 1B is an outward appearance showing single HDD unit 106. FIG. 1C is an outward appearance showing a state where impact buffer 104 is stuck to HDD unit 106. Impact buffer 104 is formed of first impact buffering member 101 and second impact buffering member 102 stuck to HDD unit 106 as shown in FIG. 1C. Impact buffering member 100 is further stuck to HDD unit 106. FIG. 1D is an outward appearance showing a state where impact buffer 104 and impact buffering member 100 are stuck to HDD unit 106 and HDD unit 106 is stored in HDD case (box) 107.

Figure 2A:
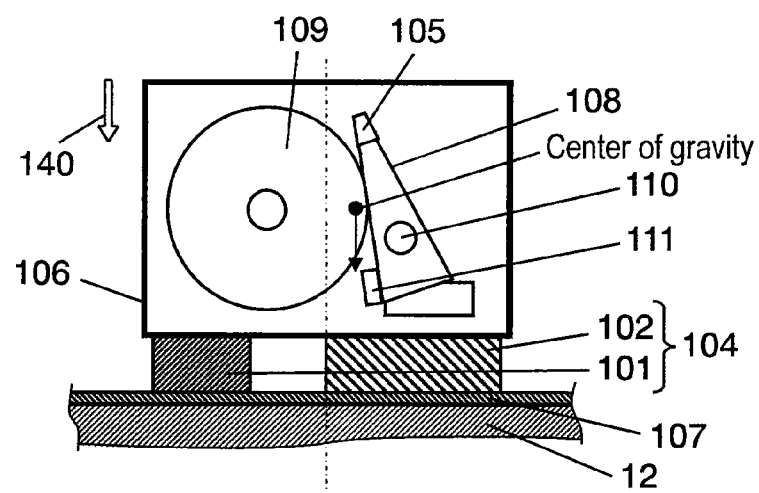
FIG. 2A is a schematic sectional view showing a state where the HDD unit is dropping.
Figure 2B:
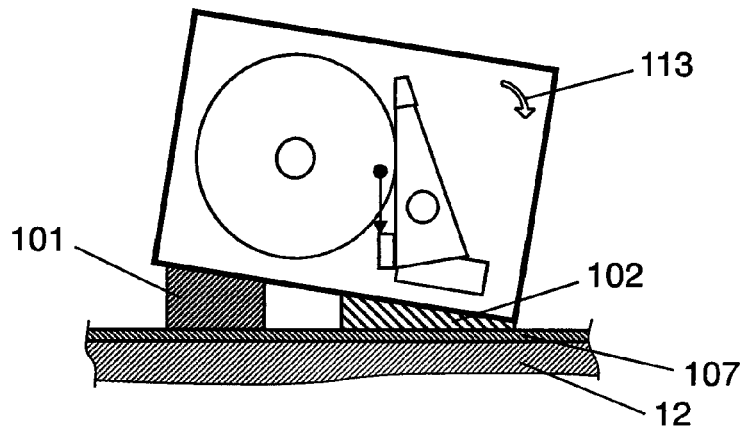
FIG. 2B is a schematic sectional view showing a state where the HDD unit drops, collides against the ground or the like, and then tilts to the side of the center of gravity.
Figure 2C:
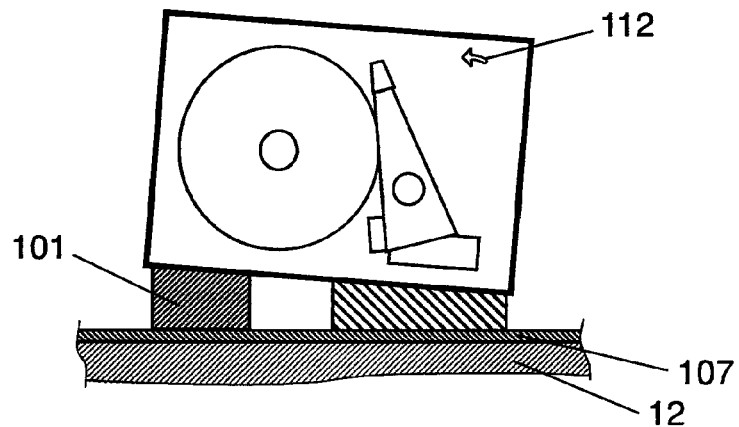
FIG. 2C is a schematic sectional view showing a state where the HDD unit drops and collides against the ground or the like, and then restoring force of the impact buffer works.

FIG. 2A, FIG. 2B and FIG. 2C are schematic sectional views showing operations of impact buffer 104 and HDD unit 106 when a user accidentally drops the notebook computer and uses impact buffer 104 in accordance with the first exemplary embodiment. FIG. 2A is a schematic sectional view showing a state where HDD unit 106 is dropping. FIG. 2B is a schematic sectional view showing a state where HDD unit 106 drops, collides against the ground or the like, and then tilts to the side of the center of gravity. FIG. 2C is a schematic sectional view showing a state where HDD unit 106 drops and collides against the ground or the like, and then restoring force of impact buffer 104 works.

In FIG. 2A, FIG. 2B and FIG. 2C, HDD unit 106 has the following elements:
  magnetic head 105;
  head arm 108 mounted to rotating shaft 110;
  magnetic disk 109 on which magnetic data is recorded; and
  head arm rotation stopper 111 for fixing head arm 108 to prevent it from moving freely from a shunting position.

Head arm rotation stopper 111 has an inertia latch structure as described later. The external part of HDD unit 106 is not shown except for body 12, HDD case 107, and an impact receiving part of impact buffer 104. As shown in FIG. 2A, the center-of-gravity position of HDD unit 106 is assumed to be on the right side of the center line (dashed line) of the substantially rectangular casing surface of HDD unit 106.

As shown in FIG. 1A, notebook computer 11 as an information processor has the following elements:

body 12 of notebook computer 11 including an information processing circuit (not shown);

notebook computer display unit 13 including a liquid crystal panel and a liquid crystal display circuit (not shown); and impact buffering device 14 formed of impact buffer 104 storing HDD unit 106, impact buffering member 100, and HDD case (box) 107.

In this example, HDD unit 106 is mounted to body 12 of notebook computer 11; however, HDD unit 106 may be mounted to the casing of a portable HDD. In other words, impact buffering device 14 has HDD case 107, impact buffer 104, and impact buffering member 100, and space for storing HDD unit 106. HDD case 107 may be space formed of the inner walls of the casing of the notebook computer or portable HDD.

Impact buffer 104 is formed of first impact buffering member 101 and second impact buffering member 102 that have elasticity and buffer an impact by expanding or contracting on receiving the impact. First impact buffering member 101 and second impact buffering member 102 are preferably made of resin foam, gel, or rubber. As the resin foam, expanded polyurethane or the like can be used and exhibits preferable impact buffering performance. The expanded polyurethane is a material generally used for a personal computer or an automobile. In the present embodiment, impact buffer 104 includes two impact buffering members with different hardness. However, impact buffer 104 may include two or more impact buffering members. These impact buffering members are contacted with at least one surface of a side surface part of HDD unit 106 that is orthogonal to the surface of magnetic disk 109 of HDD unit 106, support HDD unit 106, and buffer an impact applied to HDD unit 106 by expansion and contraction of them.

Figure 5:
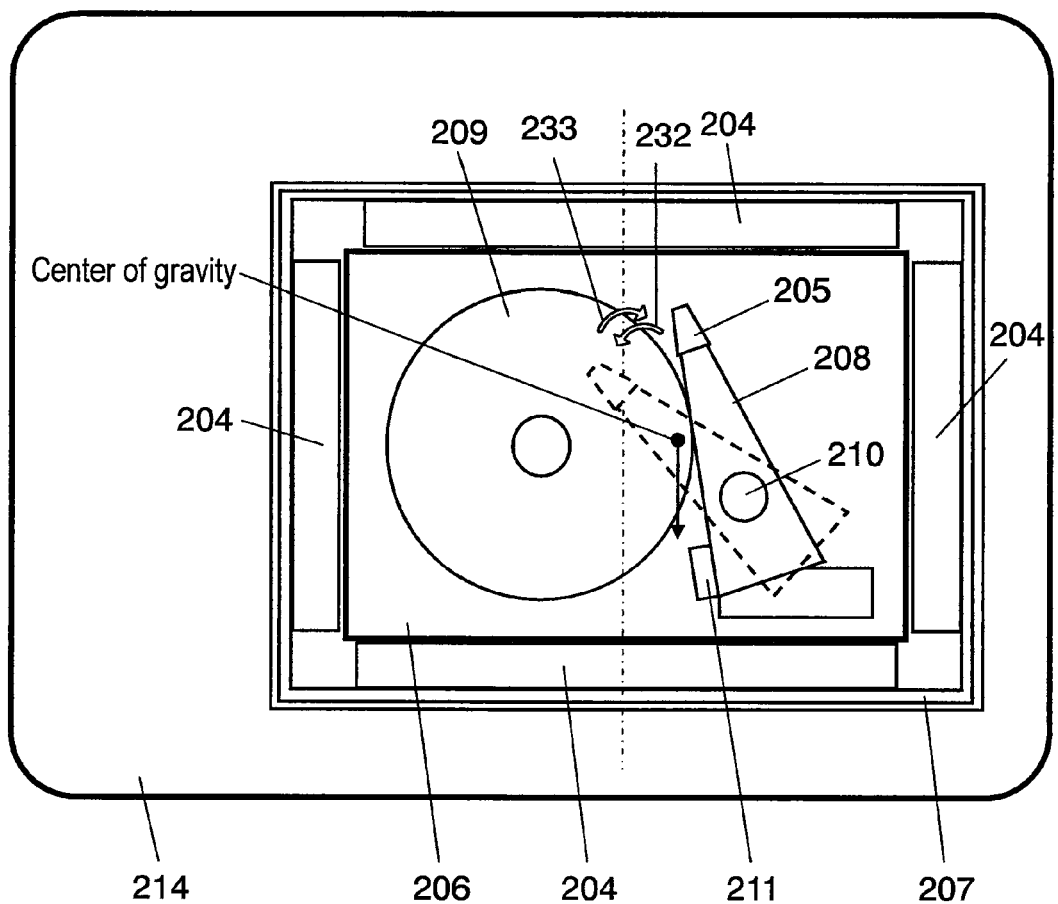
FIG. 5 is a schematic sectional view showing the state where a conventional impact buffer is butted and mounted on an HDD unit apt to be affected by an impact.

As shown in FIG. 1C, FIG. 2A, FIG. 2B, and FIG. 2C, HDD unit 106 has first impact buffering member 101 with high hardness and second impact buffering member 102 with low hardness. As shown in FIG. 1C, FIG. 2A, FIG.2B, and FIG. 2C, the center of gravity of the HDD unit 106 is disposed between a center of the first buffering member 101 and a center of the second buffering member 102. In other words, first impact buffering member 101 and second impact buffering member 102 are impact buffering members with different hardness, and first impact buffering member 101 is made of a material with a hardness higher than that of second impact buffering member 102. Second impact buffering member 102 is contacted with one surface of the side surface part of HDD unit 106, namely on the side surface part positioned in the head unloading direction of head arm 108 described in FIG. 5. First impact buffering member 101 is disposed in parallel with second impact buffering member 102 on the side surface part positioned in the head loading direction of head arm 108 described in FIG. 5. In other words, as shown in FIG. 2A, second impact buffering member 102 is contacted with the side surface part, which is positioned orthogonally to the magnetic disk 109 surface of the HDD unit 106, of HDD unit 106. The side surface part is positioned at an opposite side to a surface, which a magnetic head 105 approaches, and in the head unloading direction of head arm 108. First impact buffering member 101 is contacted with a side surface part, which is on a side having second impact buffering member 102 and is positioned in a head loading direction of head arm 108, of HDD unit 106.

Operations of impact buffer 104, impact buffering device 14, and HDD unit 106 constituted as above are described in detail with reference to FIG. 2A, FIG. 2B and FIG. 2C.

When HDD unit 106 drops to the ground or a desk in the direction of arrow 140 as shown in FIG. 2A, body 12 of notebook computer 11 collides against the ground or the desk in a short time as shown in FIG. 2B. As a result, the displacement of the center-of-gravity position of HDD unit 106 from the center line of the substantially rectangular casing surface of HDD unit 106 causes HDD unit 106 to temporarily rotate clockwise (direction of arrow 113) as shown in FIG. 2B. Second impact buffering member 102 receives an impact by the rotation, and hence is compressed and deformed in the impact direction. At this time, viscous resistance occurs, so that the compression and deformation are disturbed and the impact energy is consumed.

Since the hardness of second impact buffering member 102 is lower than that of first impact buffering member 101, the degree of the compression and deformation of second impact buffering member 102 is larger than that of first impact buffering member 101, and HDD unit 106 rotates clockwise (direction of arrow 113) in FIG. 2B. When the impact by the drop is large at this time, second impact buffering member 102 cannot absorb the impact and hence the lower right corner of HDD unit 106 sometimes collides against HDD case 107. In this case, the clockwise rotation (direction of arrow 113) does not cause head detachment. In other words, rotating force in the head unloading direction occurs in head arm 108, so that the head detachment does not occur.

In other words, when first impact buffering member 101 and second impact buffering member 102 are compressed and deformed by an impact applied to HDD unit 106, first impact buffering member 101 and second impact buffering member 102 support HDD unit 106 so that HDD unit 106 rotates in a head unloading direction of a head arm of HDD unit106, and first impact buffering member 101 and second impact buffering member 102 buffer the impact applied to HDD unit 106.

After the drop and collision, as shown in FIG. 2C, first impact buffering member 101 can sufficiently absorb the impact because the first impact buffering member 101 is harder than second impact buffering member 102. Therefore, the lower left corner of HDD unit 106 does not collide against HDD case 107 differently from the conventional art. The restoring force of impact buffer 104 causes HDD unit 106 to rotate counterclockwise (direction of arrow 112) about the first impact buffering member 101 side as a fulcrum more slowly than the clockwise rotation (direction of arrow 113) by the impact by free fall. Then, HDD unit 106 returns to the original position. In this case, rotating force in the head unloading direction occurs in head arm 108, but impact buffer 104 weakens the rotating force and hence the head detachment does not occur.

In other words, when first impact buffering member 101 and second impact buffering member 102 are compressed and deformed by an impact applied to HDD unit 106 and is restored, first impact buffering member 101 and second impact buffering member 102 are disposed so as to support and expand/contract HDD unit 106 while rotating in a head loading direction of the head arm at a speed slower than that in expansion/contraction by the restoring force of the impact buffer, and first impact buffering member 101 and second impact buffering member 102 buffer the impact applied to HDD unit 106.

In the present embodiment, the impact buffer has first and second impact buffering members having different hardness, and hence makes the rotation in the direction where the head detachment phenomenon can occur in the HDD unit slower than the rotation by free fall. As a result, the head detachment can be avoided and high buffering effect is produced.

The impact buffer therefore requires only a small number of components to reduce the cost, and has a simple structure to facilitate mass production such as manufacturing and assembling. Inexpensive mass production is therefore allowed.

In the impact buffer of the present embodiment, at least one surface of the impact buffer abutting on a device such as an HDD unit that is apt to receive an impact can be made of only an impact buffering member so as to allow mounting using double-stick paper, for example. The number of components and the cost of the impact buffer can be reduced.

The impact buffer can be easily downsized and lightened in weight, so that the impact buffer is appropriate for use in a notebook computer whose size and weight are required to be reduced.

In FIG. 2A FIG. 2B and FIG. 2C, the center-of-gravity position of HDD unit 106 is assumed to be on the right side of the center line (dashed line) of the substantially rectangular casing surface of HDD unit 106. However, even when the center-of-gravity position of HDD unit 106 is on the left side of the center line of the substantially rectangular casing surface of HDD unit 106, the positional relationship and hardness relationship between first impact buffering member 101 and second impact buffering member 102 are not changed. The reason for this is described below.

First, the hardness difference between first impact buffering member 101 and second impact buffering member 102 is set to be further large so that the HDD unit 106 rotates in the direction where head detachment does not occur just when the notebook computer drops and arrives at the ground. In other words, when the center-of-gravity position of HDD unit 106 is on the left side of the center line of the substantially rectangular casing surface of HDD unit 106, second impact buffering member 102 is made further softer than first impact buffering member 101 comparing with the case where the center-of-gravity position is on the right side of the center line. Alternatively, first impact buffering member 101 may be made further harder than second impact buffering member 102. This structure causes HDD unit 106 to temporarily rotate clockwise (direction of arrow 113 having no head detachment) as shown in FIG. 2B. Then, the restoring force of second impact buffering member 102 causes HDD unit 106 to slowly rotate counterclockwise (direction of arrow 112) about the first impact buffering member 101 side as a fulcrum. Therefore, head arm 108 does not become detached from the shunting position and head detachment does not occur. In other words, impact buffer 104 has first impact buffering member 101 and second impact buffering member 102 with a hardness lower than that of first impact buffering member 101. The hardnesses of first impact buffering member 101 and second impact buffering member 102 or the hardness difference between them is varied based on the center-of-gravity position of HDD unit 106.

Figure 3:
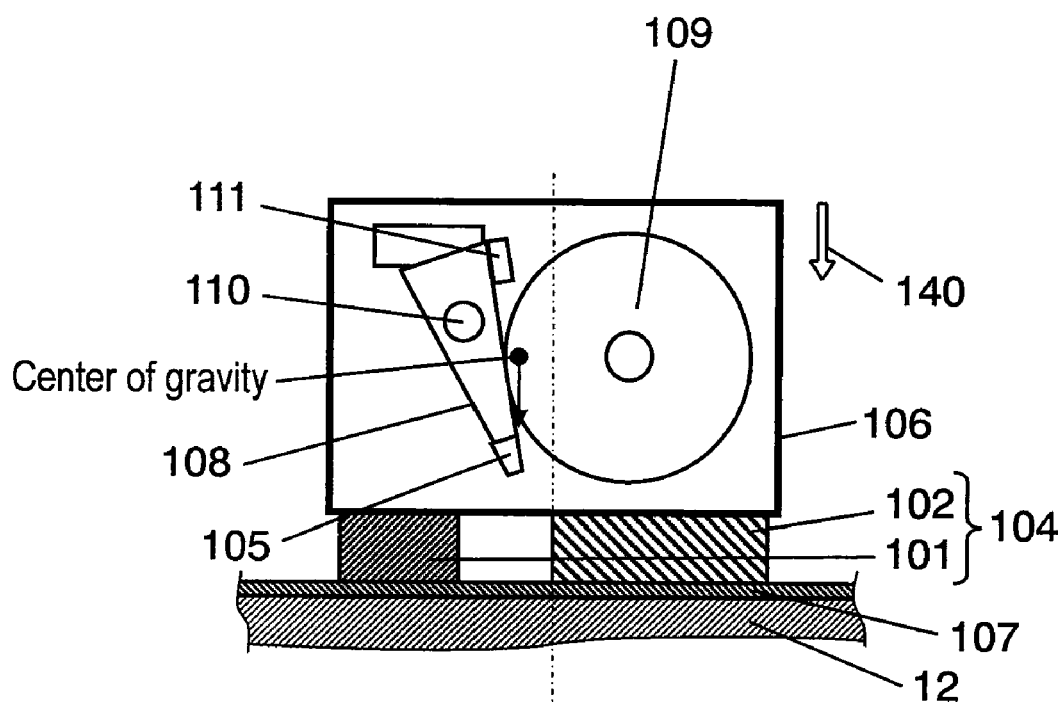
FIG. 3 is a schematic sectional view of another example showing the state where the HDD unit is dropping.

In the present embodiment, head arm 108 is disposed on the observer's right side inside HDD unit 106, as shown in FIG. 2A. However, it is considered that head arm 108 is disposed on the observer's left side inside HDD unit 106 as shown in FIG. 3. FIG. 3 is a schematic sectional view of another example showing the state where HDD unit 106 is dropping.

In this case, second impact buffering 102 member is contacted with a side surface part, which is positioned orthogonally to the magnetic disk 109 surface of HDD unit106, of HDD unit 106. The side surface part is positioned at an opposite side to a surface, which a magnetic head 105 approaches, and in the head unloading direction of head arm 108. First impact buffering member 102 is contacted with a side surface part, which is on a side having second impact buffering member 102 and is positioned in a head unloading direction of head arm 108, of HDD unit 106.

Since a hardness difference is provided between the first and second impact buffering members constituting the impact buffer, rotation in the direction where the head detachment phenomenon can occur in the HDD unit is more slowly than the rotation by free fall. As a result, the head detachment can be avoided and high buffering effect is produced.

Impact buffer 104 having first impact buffering member 101 and second impact buffering member 102 is disposed on one surface of the side surface part of HDD unit 106 in the present embodiment; however, impact buffer 104 may be disposed on the side surface part on the opposite side to the one surface. In this case, first impact buffering member 101 and second impact buffering member 102 are positioned so that they are substantially symmetric with respect to the center of gravity of HDD unit 106. In this structure, impact buffer 104 effectively operates against the impact from the opposite surface.

It is assumed that first impact buffering member 101 and second impact buffering member 102 receive an impact and are compressed for buffering, but the compression does not arrive at the maximum compression where first impact buffering member 101 and second impact buffering member 102 lose elasticity in a buffering region. Here, the buffering region is the region between HDD unit 106 and HDD case 107 in FIG. 2A FIG. 2B and FIG. 2C. In this case, preferably, the materials, sizes, and sticking positions of first impact buffering member 101 and second impact buffering member 102 are determined so that the difference between the time when first impact buffering member 101 is compressed to the smallest size and the time when second impact buffering member 102 is compressed to the smallest size is 6 msec or smaller.

It is appropriate that first impact buffering member 101 having higher hardness, of first impact buffering member 101 and second impact buffering member 102, has a hardness of 35 through 45 degrees.

Appropriate materials of first impact buffering member 101 and second impact buffering member 102 are resin foam material, gel material, or rubber material.

The time difference (6 msec or smaller) when each of first impact buffering member 101 and second impact buffering member 102 is compressed to the smallest size, the hardness (35 through 45 degrees) of first impact buffering member 101, and materials (resin foam material, gel material, or rubber material) of first impact buffering member 101 and second impact buffering member 102 are determined empirically and experimentally.

Figure 6A:
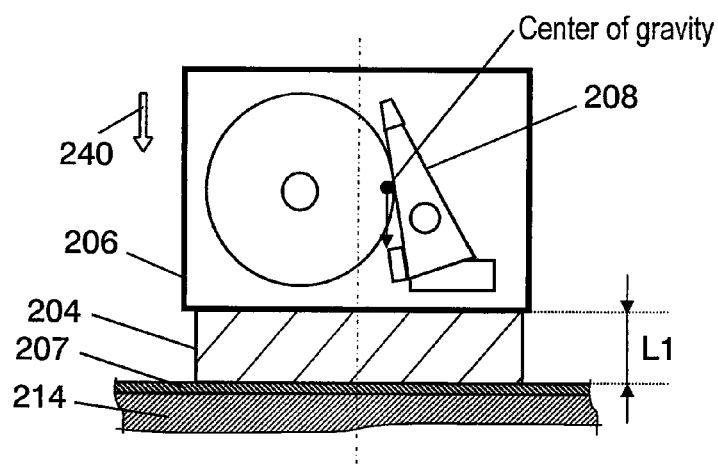
FIG. 6A is a schematic sectional view showing a state where the conventional HDD unit is dropping.
Figure 6B:
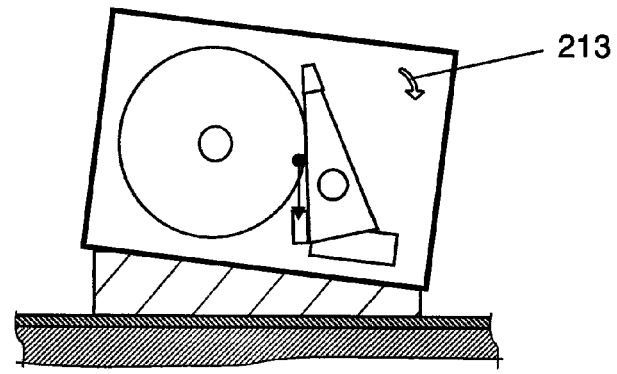
FIG. 6B is a schematic sectional view showing a state where the conventional HDD unit drops, collides against the ground or the like, and then tilts to the side of the center of gravity.
Figure 6C:
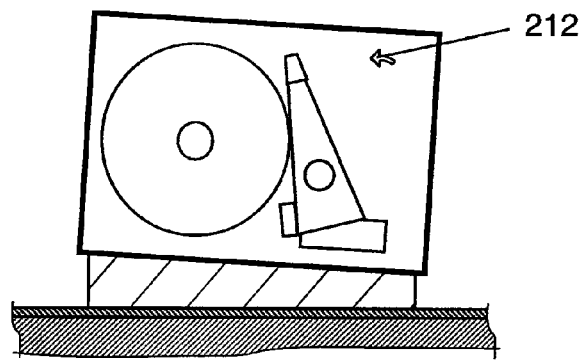
FIG. 6C is a schematic sectional view showing a state where the conventional HDD unit drops and collides against the ground or the like, and then restoring force of the impact buffer works.
Figure 6D:
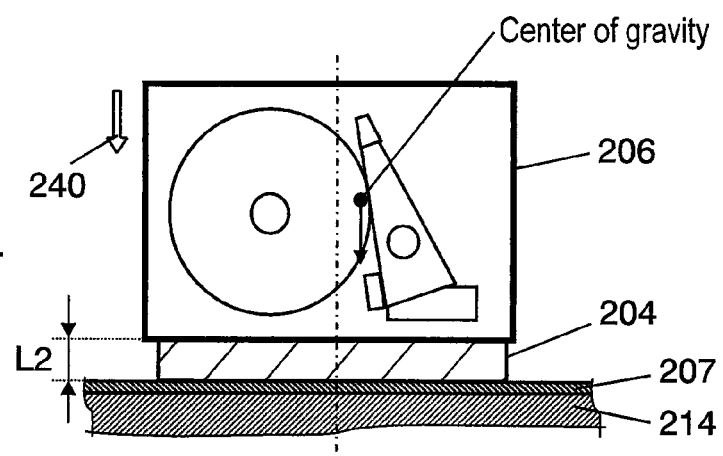
FIG. 6D is a schematic sectional view showing another state where the conventional HDD unit is dropping.
Figure 6E:
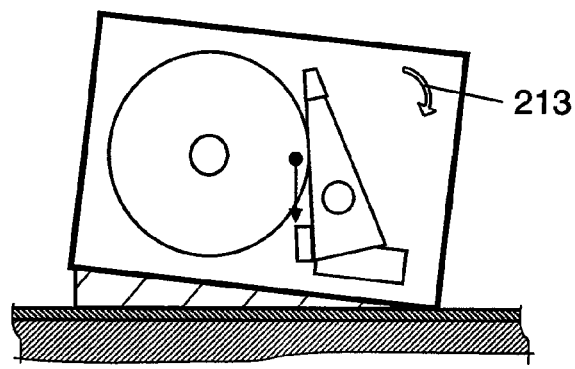
FIG. 6E is a schematic sectional view showing another state where the conventional HDD unit drops, collides against the ground or the like, and then tilts to the side of the center of gravity.
Figure 6F:
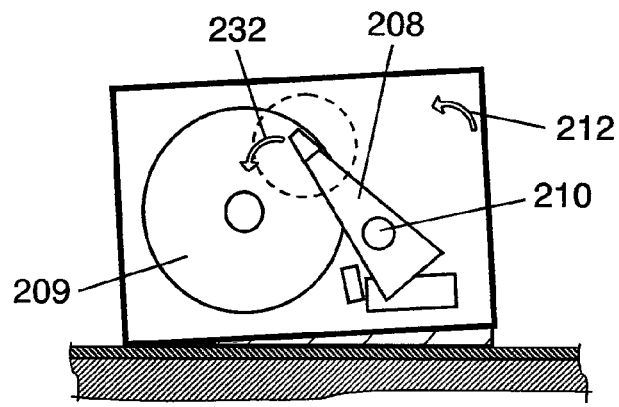
FIG. 6F is a schematic sectional view showing another state where the conventional HDD unit drops and collides against the ground or the like, and then restoring force of the impact buffer works.

In the conventional description, the right end of HDD unit 206 collides against HDD case 207 for a first time as shown in FIG. 6E, and the left end of HDD unit 206 collides against HDD case 207 for a second time as shown in FIG. 6F. When the time difference of the compressions of first impact buffering member 101 and second impact buffering member 102 to the smallest sizes is 6 msec or larger, the functions of first impact buffering member 101 and second impact buffering member 102 are not sufficiently exhibited, a second collision occurs at the left end of HDD unit 206 causing head detachment, as shown in FIG. 6F. Alternatively, the inertial latch structure normally operates beyond the time lag range where the inertial latch structure does not operate, and head detachment is prevented.

For a similar reason, in the present embodiment, the hardness and material of the impact buffering member are appropriately selected and disposed, thereby preventing the second collision from occurring at the left end of HDD unit 106 causing the head detachment or thereby exceeding the time lag range where the inertial latch structure does not operate.

The information processor may be a personal digital assistant (PDA) having an HDD unit or the like that is apt to be affected by an impact, a game machine, a reproducing device and recording device of video and voice, a portable phone, or an electronic dictionary device.

The HDD unit built in the notebook computer has been illustrated as the device apt to be affected by an impact, but the present invention is not limited to this. When a device is built in a portable apparatus, the center of gravity of the device displaces from the center line of the casing of the device, and the impact resistant performance is considered, the impact buffer of the present invention works especially effectively.

Second Exemplary Embodiment

Figure 4A:
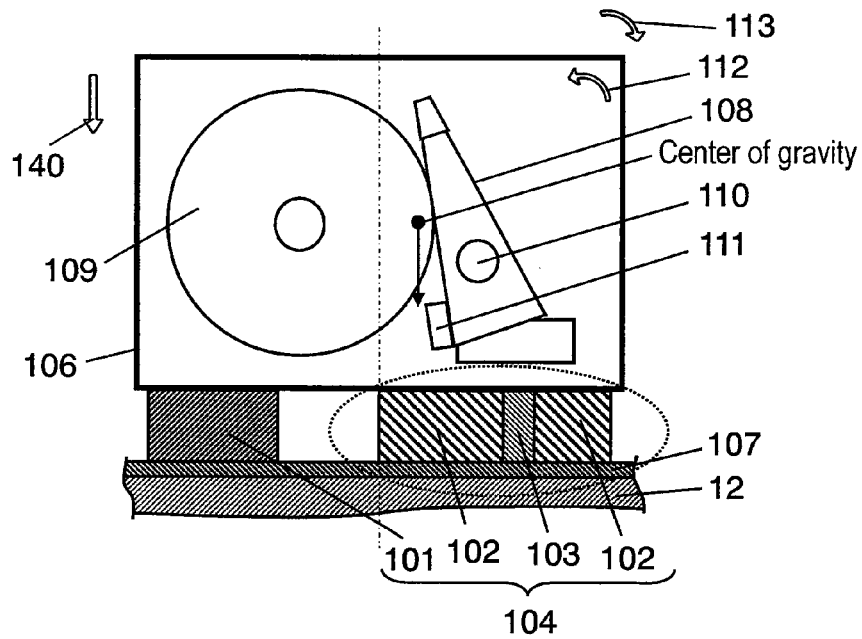
FIG. 4A is a schematic sectional view illustrating structures of an impact buffer and an HDD unit protected by the impact buffer and showing the state where the HDD unit is dropping in accordance with a second exemplary embodiment of the present invention.

FIG. 4A, FIG. 4B, FIG. 4C and FIG. 4D are schematic sectional views showing structures of impact buffer 104 of the second exemplary embodiment of the present invention and HDD unit 106 protected by impact buffer 104 and showing the state where HDD unit 106 is dropping. In the first exemplary embodiment, impact buffer 104 has first impact buffering member 101 and second impact buffering member 102. The second exemplary embodiment differs from the first exemplary embodiment in that impact buffer 104 has first impact buffering member 101, second impact buffering member 102, and third impact buffering member 103 as shown in FIG. 4A. In the second exemplary embodiment, elements similar to those in the first exemplary embodiment are denoted with the same reference marks, and the descriptions of similar elements and operations are omitted.

In FIG. 4A, FIG. 4B, FIG. 4C and FIG. 4D, first impact buffering member 101 and second impact buffering member 102 have a different hardness, and first impact buffering member 101 is made of material harder than that of second impact buffering member 102 similarly to the description of FIG. 2A, FIG. 2B and FIG. 2C. First impact buffering member 101 is contacted with the side having a magnetic disk on a side surface part of HDD unit 106. Second impact buffering member 102 is contacted with the side having head arm 108 on the side surface part of HDD unit 106, similarly to impact buffer 104 of the first exemplary embodiment. Third impact buffering member 103 has hardness different from those of first impact buffering member 101 and second impact buffering member 102. In other words, third impact buffering member 103 is made of material harder than that of second impact buffering member 102. Third impact buffering member 103 is bonded to and gripped by second impact buffering member 102.

As shown in FIG. 4A, the center-of-gravity position of HDD unit 106 is assumed to be on the right side of the center line (dashed line) of the substantially rectangular casing surface of HDD unit 106.

Operations of impact buffer 104 and HDD unit 106 having these structures are described hereinafter in detail with reference to FIG. 4A, FIG. 4B, FIG. 4C and FIG. 4D.

When HDD unit 106 drops to the ground or a desk in the direction of arrow 140 as shown in FIG. 4A, body 12 of notebook computer 11 collides against the ground or the desk in a short time as shown in FIG. 4A. As a result, displacement of the center-of-gravity position of HDD unit 106 from the center line of the substantially rectangular casing surface of HDD unit 106 causes HDD unit 106 to temporarily rotate clockwise (direction of arrow 113).

Since first impact buffering member 101 is harder than second impact buffering member 102, after drop and collision, HDD unit 106 slowly rotates counterclockwise (direction of arrow 112) about the first impact buffering member 101 side as a fulcrum to return to an original position. These operations are similar to those of the first exemplary embodiment, so that detail descriptions are omitted.

The second exemplary embodiment differs from the first exemplary embodiment in that the timing when HDD unit 106 intends to return to the original position by counterclockwise rotation (direction of arrow 112) after clockwise rotation (direction of arrow 113) can be adjusted more accurately and broadly comparing with the first exemplary embodiment. In other words, in impact buffer 104 of the second exemplary embodiment, third impact buffering member 103 made of material harder than that of second impact buffering members 102 is bonded to and gripped by wide second impact buffering member 102. Thus, impact buffer 104 can be structured to establish the following condition. Even if the inertia latch structure temporarily becomes detached when HDD unit 106 intends to return to the original position by counterclockwise rotation (direction of arrow 112) after clockwise rotation (direction of arrow 113), the inertia latch structure works again before head arm 108 becomes detached from the shunting position. In other words, the hardness of impact buffer 104 is adjusted so as to prevent occurrence of the time lag when head arm rotation stopper 111 does not work and so as to provide the timing when the inertia latch structure of head arm rotation stopper 111 works appropriately, thereby adjusting the timing when the impact absorbing function and the restoring force of impact buffer 104 work.

As discussed above, head arm 108 staying at the shunting position has a structure where the inertia latch structure of head arm rotation stopper 111 can engage a latch regardless of the rotating direction of HDD unit 106. When HDD unit 106 rotates counterclockwise (direction of arrow 112) after starting of the inertia latch structure, however, time lag occurs in the latch operation until the inertia latch structure restarts. When head arm 108 rotates counterclockwise (direction of arrow 112) due to the inertia with this timing, the inertia latch structure does not work, the motion of head arm 108 cannot be inhibited, and the head detachment occurs sometimes. In other words, when the factors of both the counterclockwise rotation of head arm 108 and the timing of non-operation of the inertial latch structure conspire, the head detachment occurs disadvantageously.

In the present embodiment, impact buffer 104 is structured so as to avoid the head detachment by effectively operating the inertial latch structure by accurately and more broadly adjusting the rotation of head arm 108 caused by the impact by a drop and the latch timing of the inertial latch structure. The whole hardness of impact buffer 104 can be adjusted so as to prevent occurrence of the time lag when head arm rotation stopper 111 does not work and so as to provide the timing when the inertia latch structure of head arm rotation stopper 111 works appropriately. Thus, the timing when the impact absorbing function and the restoring force of impact buffer 104 work can be adjusted.

Figure 4B:
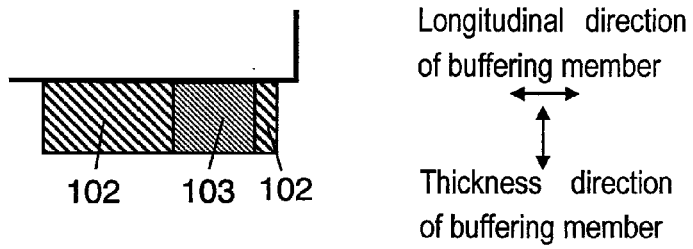
FIG. 4B is an outward appearance showing a structure obtained by sticking, to the HDD unit, an impact buffer where the longitudinal size of a third impact buffering member is varied.
Figure 4C:
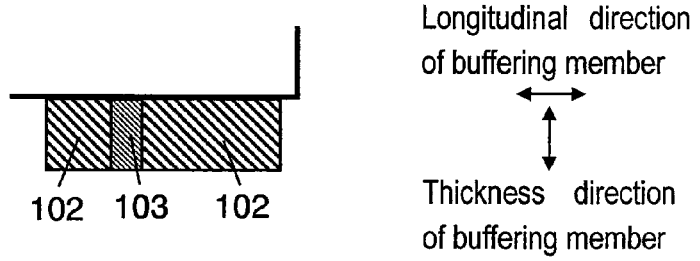
FIG. 4C is an outward appearance showing a structure obtained by sticking, to the HDD unit, an impact buffer where the longitudinal relative position of the third impact buffering member is varied.

Impact buffer 104 with another structure for adjusting the working timing of the impact-absorbing function and restoring force of impact buffer 104 is described hereinafter. FIG. 4B is a sectional view showing a structure obtained by sticking, to HDD unit 106, impact buffer 104 where the longitudinal size of third impact buffering member 103 is varied. In a case where a long side of a side surface part of the HDD unit 106 is defined as a longitudinal direction and a direction orthogonal to the side surface part is defined as a thickness direction. The adjustment of the timing of the inertia latch structure can be set depending on the material and the longitudinal size of third impact buffering member 103, as shown in FIG. 4B. As shown in FIG. 4C, the adjustment can be set depending on the relative position with respect to the longitudinal direction of second impact buffering members 102.

Figure 4D:
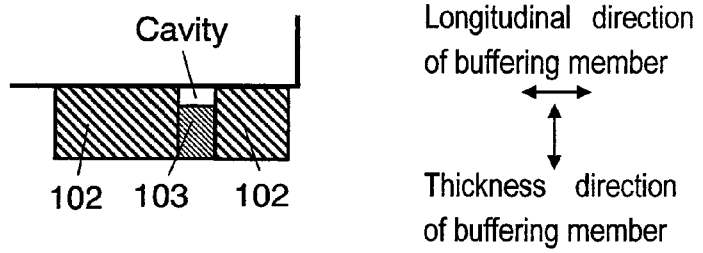
FIG. 4D is an outward appearance showing a structure obtained by sticking, to the HDD unit, an impact buffer where the size of the thickness direction of the third impact buffering member is varied.

Impact buffer 104 with yet another structure for adjusting the working timing of the impact-absorbing function and restoring force of impact buffer 104 is described hereinafter. FIG. 4D is a sectional view showing a structure obtained by sticking, to HDD unit 106, impact buffer 104 where the size of the thickness direction of third impact buffering member 103 is varied. As shown in FIG. 4D, a cavity may be formed by varying the size of the thickness direction of third impact buffering member 103 independently from second impact buffering members 102. The timing may be adjusted by varying the whole hardness of impact buffer 104 that includes the formed cavity, second impact buffering members 102, third impact buffering member 103, and first impact buffering member 101. The cavity is formed on the side surface part of HDD unit 106 in FIG. 4D; however, the cavity may be formed on the opposite side (HDD case 107 side) to the side surface part of HDD unit 106. Forming the cavity in this manner allows accurate adjustment of timing and allows independent setting of the working time of the restoring force and the strength of the restoring force after the impact by a drop or the like. The restoring force can be set to be decreased when the deformation of the impact buffer is small, or to be increased when the deformation larger than a predetermined value occurs.

The impact buffer of the present embodiment can effectively operate the inertia latch structure of the head arm rotation stopper, by providing a hardness difference between first and second impact buffering members and by gripping and mixing the third impact buffering member with different hardness into the second impact buffering member. As a result, possibility of causing the head detachment of the HDD unit can be further avoided comparing with the first embodiment.

What is claimed is:

1. A supporting structure of a hard disk drive unit (HDD unit) in an information processor, the information processor comprising:
    the HDD unit;
    a box having a spacer for storing the HDD unit; and
    an impact buffer,
    wherein the impact buffer comprises two or more spaced apart impact buffering members with different hardness,
    the impact buffering members include at least a first impact buffering member and a second impact buffering member with a hardness lower than that of the first impact buffering member,
    the first impact buffering member and the second impact buffering member are disposed on at least one surface of a side surface part of the HDD unit, the side surface part being orthogonal to a magnetic disk surface of the HDD unit, and
    when the impact buffer is compressed and deformed by an impact applied to the HDD unit, the impact buffer which is spaced apart supports and expands/contracts so that the HDD unit rotates in a head unloading direction of a head arm of the HDD unit, and the first impact buffering member and the second impact buffering member buffer the impact applied to the HDD unit.

2. The support structure of claim 1,
    wherein when the impact buffer is compressed and deformed by an impact applied to the HDD unit and is restored, the impact buffer supports and expands/contracts so that the HDD unit rotates in a head loading direction of the head arm at a speed slower than that in expansion/contraction by restoring force of the impact buffer, and the impact buffer buffers the impact applied to the HDD unit.

3. The supporting structure of claim 1,
    wherein the second impact buffering member is contacted with a side surface part, which is positioned orthogonally to the magnetic disk surface of the HDD unit, of the HDD unit,
    the side surface part is positioned at an opposite side to a surface, which a magnetic head approaches, and in the head unloading direction of the head arm, and
    the first impact buffering member is contacted with a side surface part, which is on a side having the second impact buffering member and is positioned in a head loading direction of the head arm, of the HDD unit.

4. The supporting structure of claim 1,
    wherein the second impact buffering member is contacted with a side surface part, which is positioned orthogonally to the magnetic disk surface of the HDD unit, of the HDD unit,
    the side surface part is positioned at an opposite side to a surface, which a magnetic head approaches, and in the head unloading direction of the head arm, and
    the first impact buffering member is contacted with a side surface part, which is on a side having the second impact buffering member and is positioned in a head unloading direction of the head arm, of the HDD unit.

5. The supporting structure of claim 1,
    wherein hardnesses of the first impact buffering member and the second impact buffering member or hardness difference between the first impact buffering member and the second impact buffering member is varied based on a center-of-gravity position of the HDD unit.

6. The supporting structure of claim 1,
    wherein the first impact buffering member and the second impact buffering member buffer an impact and are compressed in a buffering region, and difference between time when the first impact buffering member is compressed to the smallest size and time when the second impact buffering member is compressed to the smallest size is 6 msec or smaller.

7. The supporting structure of claim 1,
    wherein the impact buffering members are made of one of resin foam material, gel material, and rubber material.

8. The supporting structure of claim 5,
    wherein hardness of the first impact buffering member is set at 35 through 45 degrees.

9. The supporting structure of claim 5 further comprising a third impact buffering member made of material harder than the second impact buffering member,
    wherein the third impact buffering member is bonded to the second buffering member.

10. The supporting structure of claim 9,
wherein in a case where a long side of a side surface part of the HDD unit is defined as a longitudinal direction and a direction orthogonal to the side surface part is defined as a thickness direction,
the third impact buffering member is formed by varying at least one of a size in the longitudinal direction, a relative position in the longitudinal direction to the second impact buffering member, and a size in the thickness direction.

11. The supporting structure of claim 10,
wherein a cavity is formed on a side of a side surface part of the HDD unit or on the opposite side to the side surface part of the HDD unit in the third impact buffering member.

12. The supporting structure of claim 1,
wherein the impact buffer having the first impact buffering member and the second impact buffering member is disposed on each of one surface of a side surface part of the HDD unit and a side surface part on the opposite side to the one surface.

13. The supporting structure of claim 12,
wherein the first impact buffering member and the second impact buffering member are positioned substantially symmetrically with respect to a center of gravity of the HDD unit.

14. A mounting structure of an impact buffering device, the device comprising an apparatus to be protected and an impact buffer attached to an outer surface of the apparatus,
wherein the impact buffer comprises two or more spaced apart impact buffering members with different hardness,
the impact buffering members include at least a first impact buffering member and a second impact buffering member with a hardness lower than a hardness of the first impact buffering member, and
a center of gravity of the apparatus is disposed between a center of the first impact buffering member and a center of the second impact buffering member with respect to a direction which an impact is applied to the apparatus.

15. The mounting structure of claim 14,
wherein after the impact is applied to the impact buffer, and the first impact buffering member and the second impact buffering member are compressed and deformed, the impact buffer is restored by restoring force of the impact buffer at a speed slower than a speed in the compression and the deformation.

16. The mounting structure of claim 14,
wherein the hardness of the first impact buffering member and the second impact buffering member are varied, or the difference of the hardness of the first impact buffering member and the second impact buffering member are varied according to a position of the center of gravity of the apparatus.

17. The mounting structure of claim 14, further comprising a third impact buffering member made of material harder than the second impact buffering member,
wherein the third impact buffering member is bonded to the second impact buffering member.

18. The mounting structure of claim 14,
wherein the first impact buffering member is contacted with a side surface part of the apparatus to be protected, and
the second impact buffering member is contacted with a side surface part, which is opposite to the surface where the first impact buffering member contacts.

19. The mounting structure of claim 14,
wherein the first impact buffering member and the second impact buffering member are positioned substantially symmetrically with respect to the center of gravity of the apparatus.

20. An electronic apparatus comprising the mounting structure of claim 14 in its structure.

* * * * *